(12) United States Patent
Eckert

(10) Patent No.: US 8,065,834 B2
(45) Date of Patent: Nov. 29, 2011

(54) TWO PIECE PLANT CONTAINER WITH WATER RESERVOIR

(76) Inventor: Karl Eckert, Sterling Heights, MI (US)

( * ) Notice: Subject to any disclaimer, the term of this patent is extended or adjusted under 35 U.S.C. 154(b) by 162 days.

(21) Appl. No.: 12/660,525

(22) Filed: Feb. 26, 2010

(65) Prior Publication Data

US 2010/0218422 A1 Sep. 2, 2010

Related U.S. Application Data

(60) Provisional application No. 61/208,846, filed on Feb. 27, 2009.

(51) Int. Cl.
*A01G 31/02* (2006.01)

(52) U.S. Cl. .............................. 47/66.1; 47/79

(58) Field of Classification Search .................. 47/59 R, 47/65.5, 65.6, 66.1, 66.7, 79, 85, 86
See application file for complete search history.

(56) References Cited

U.S. PATENT DOCUMENTS

| | | | | |
|---|---|---|---|---|
| 3,137,096 A | * | 6/1964 | Hopkins | 47/79 |
| 4,077,159 A | * | 3/1978 | Haglund | 47/65.6 |
| D257,529 S | * | 11/1980 | Raap | D11/164 |
| 6,038,814 A | * | 3/2000 | Miotto | 47/79 |
| 6,276,090 B1 | * | 8/2001 | Lai | 47/79 |
| D642,957 S | * | 8/2011 | Eckert | D11/153 |
| 2005/0102900 A1 | * | 5/2005 | Valiquette et al. | 47/79 |
| 2008/0141587 A1 | * | 6/2008 | Guthrie | 47/86 |
| 2010/0218422 A1 | * | 9/2010 | Eckert | 47/65.6 |

* cited by examiner

*Primary Examiner* — Frank T Palo
(74) *Attorney, Agent, or Firm* — John R. Benefiel

(57) ABSTRACT

A two part plant container includes an outer tub part having a series of step indentations around its perimeter forming horizontal rest surfaces within the outer part which are located above a lower region forming a water reservoir space. The inner part has a bottom wall areas resting on the surfaces with the inner part nested within an upper region of the outer part. A drain hole is formed through a depressed area in one of the rest surface to set the maximum water level in the reservoir which is just below lower areas of the inner part bottom wall set at the same level as the drain hole. This insures that the soil in the inner part is never wet by the water in the reservoir to prevent wicking and waterlogging of the soil while leaving only a very short gap for the roots of a plant to grow across to reach the water. Handhold features are formed into the perimeter wall of the inner part allowing easy lift out. Ribs are formed into the inner part bottom wall to stiffen the same.

10 Claims, 8 Drawing Sheets

TWO PIECE PLANT CONTAINER WITH WATER RESERVOIR

CROSS REFERENCE TO RELATED APPLICATION

This application claims the benefit of U.S. provisional application No. 61/208,846 filed on Feb. 27, 2009.

BACKGROUND OF THE INVENTION

This invention concerns plant containers and more particularly plant containers which have a built-in water reservoir to reduce the need for frequent watering. Municipalities commonly maintain large numbers container plantings hanging from light poles, etc., for decorative effect, and a need for frequent watering presents a substantial burden on city resources.

There have heretofore been developed containers with a built-in water reservoir which is situated to allow the planting to draw water from the reservoir in addition to the moisture in the soil in which the plant is growing.

In such large scale deployment of containers, it is common to frequently switch plantings for achieving seasonal displays or to rotate out plantings which are not doing well in favor of more healthy specimens. Such practice also entails considerable labor particularly when large plants and containers are involved.

In the practice of including a water reservoir defined within the container, it is important to prevent excessive water from being wicked into the soil mass as this will cause waterlogging of the soil which will cause the roots to die from disease and lack of air. If the reservoir were overfilled, this will result may occur.

It is an object of the present invention to provide a plant container which includes a water reservoir which is isolated from the soil to prevent saturation of the soil, but is spaced only a very short distance therefrom so as to allow growth of roots into the reservoir space.

It is another object to provide a two part container which allows easy removal of the inner container holding the soil and planting, as well as convenient lifting and handling of the outer container part.

It is yet another object to provide a two part container which is sturdy enough to hold heavy plantings and which has contours which are easily molded from plastic.

SUMMARY OF THE INVENTION

The above recited objects and other objects which will be understood by those with knowledge of this art are achieved by a two part container of molded plastic, an outer tub part having a bottom region defining a reservoir space and which receives an inner holder part nested within an upper region of the outer part and which holds the soil and planting.

The side wall of the outer tub part has a plurality of inwardly projecting steps formed about the perimeter defining horizontal support surfaces arranged about its interior on which a bottom wall of the inner part rests, located just above the water reservoir.

At least one of the support surfaces has a localized depressed space communicating with the reservoir space such that water can flow beneath an inner part bottom wall even while resting on the step surfaces to a drain hole in the bottom of the depressed space.

The drain hole establishes a maximum level of water in the reservoir space.

The bottom of the inner container has a pattern of openings in a major area of its bottom wall which is located just above the maximum water level in the reservoir to allow the planting roots to quickly grow into the water in the reservoir through the openings to allow water to be absorbed by the plant in addition to moisture in the soil being absorbed without danger of waterlogging the soil by a wicking action.

The planting can be thoroughly watered by pouring water into the soil mass with any excess draining into the reservoir space until the water overflows but through the drain hole with such outflow indicating to the person watering the plant that the reservoir space is filled to the maximum so that watering can be stopped.

Further drainage from the soil will also flow out through the drainage hole.

In order to provide a sturdy bottom wall easily capable of supporting the weight of the soil and plantings in the inner part, a series of radial ribs converging into a center connection are molded therein to stiffen the bottom wall.

These ribs may continue up the side wall for large containers such that the inner container is sturdy enough to support the soil and plant independently of the outer tub part.

The perimeter wall of the inner part of the container is radially indented at locations on either side thereof and open at the top to create hand grip features enabling the fingers of each hand and to be inserted therein and to be wrapped around undersurfaces, providing convenient handholds allowing easy gripping and lifting out of the inner container part from the outer part.

The steps formed into the perimeter of the outer tub part also provide handholds for lifting both parts.

A removable plug in a drain hole in the bottom of the reservoir allows substantially complete draining when both parts of the container is to be removed.

DETAILED DESCRIPTION

Figure 1:
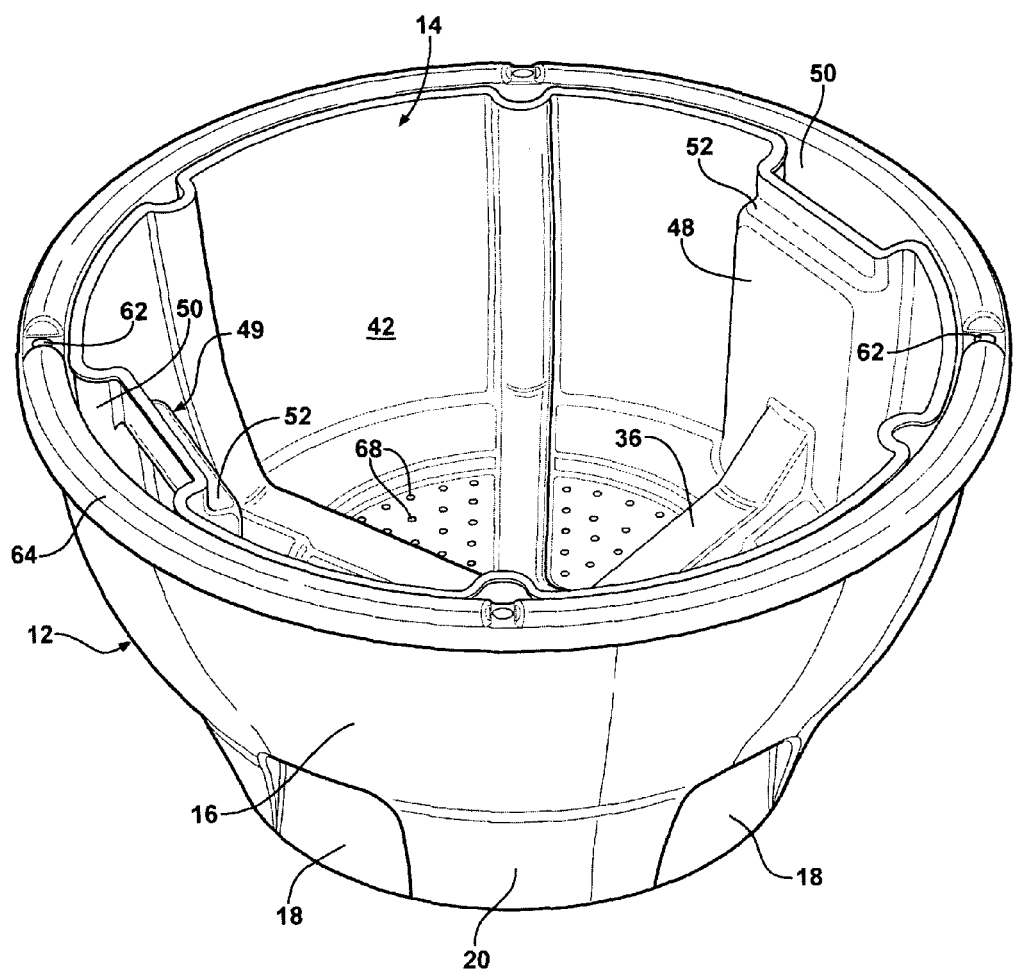
FIG. 1 is a pictorial view of a two part plant container according to the invention.
Figure 2:
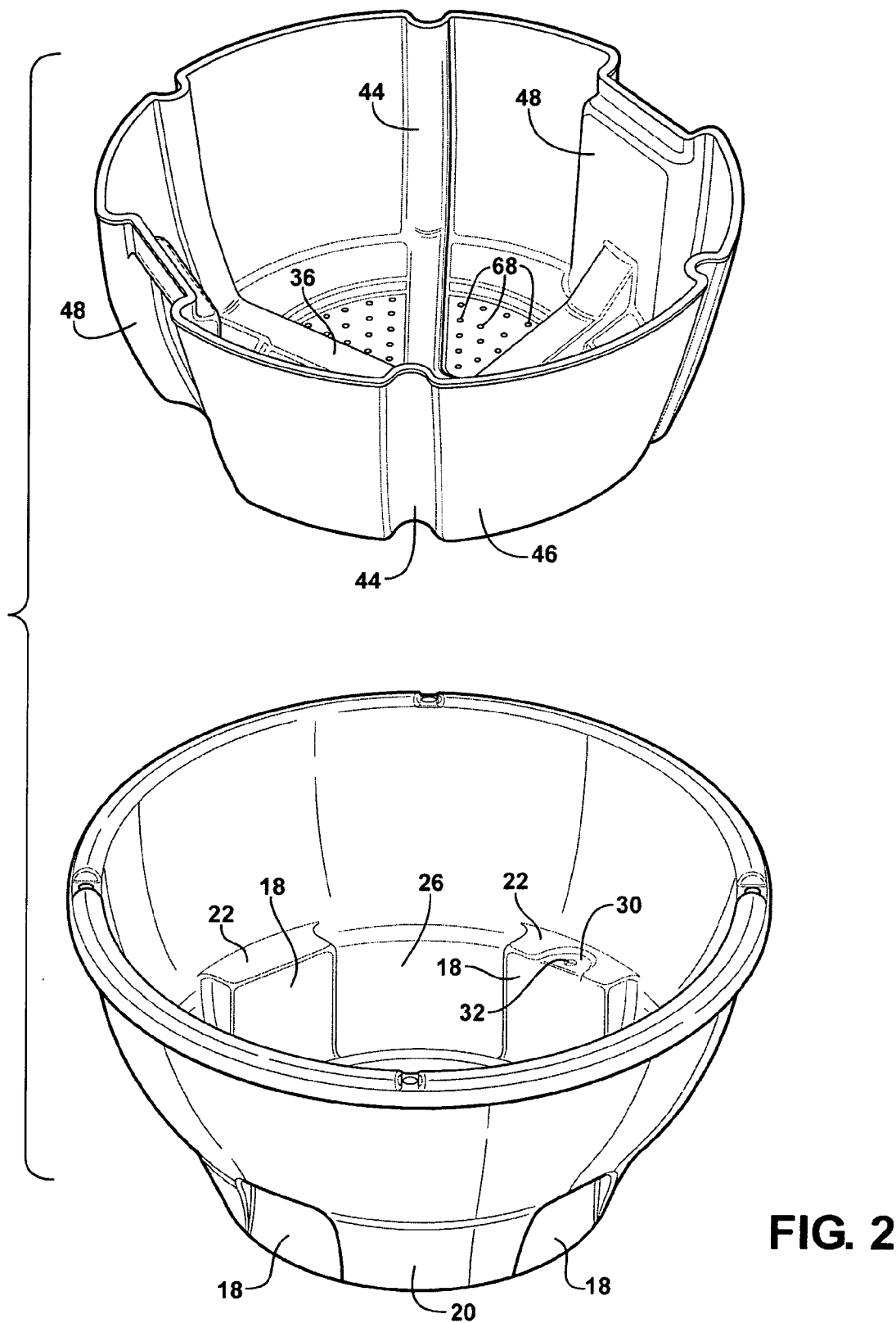
FIG. 2 is a pictorial exploded view of an outer tub part and an inner plant holder part of the container shown in FIG. 1.
Figure 3:
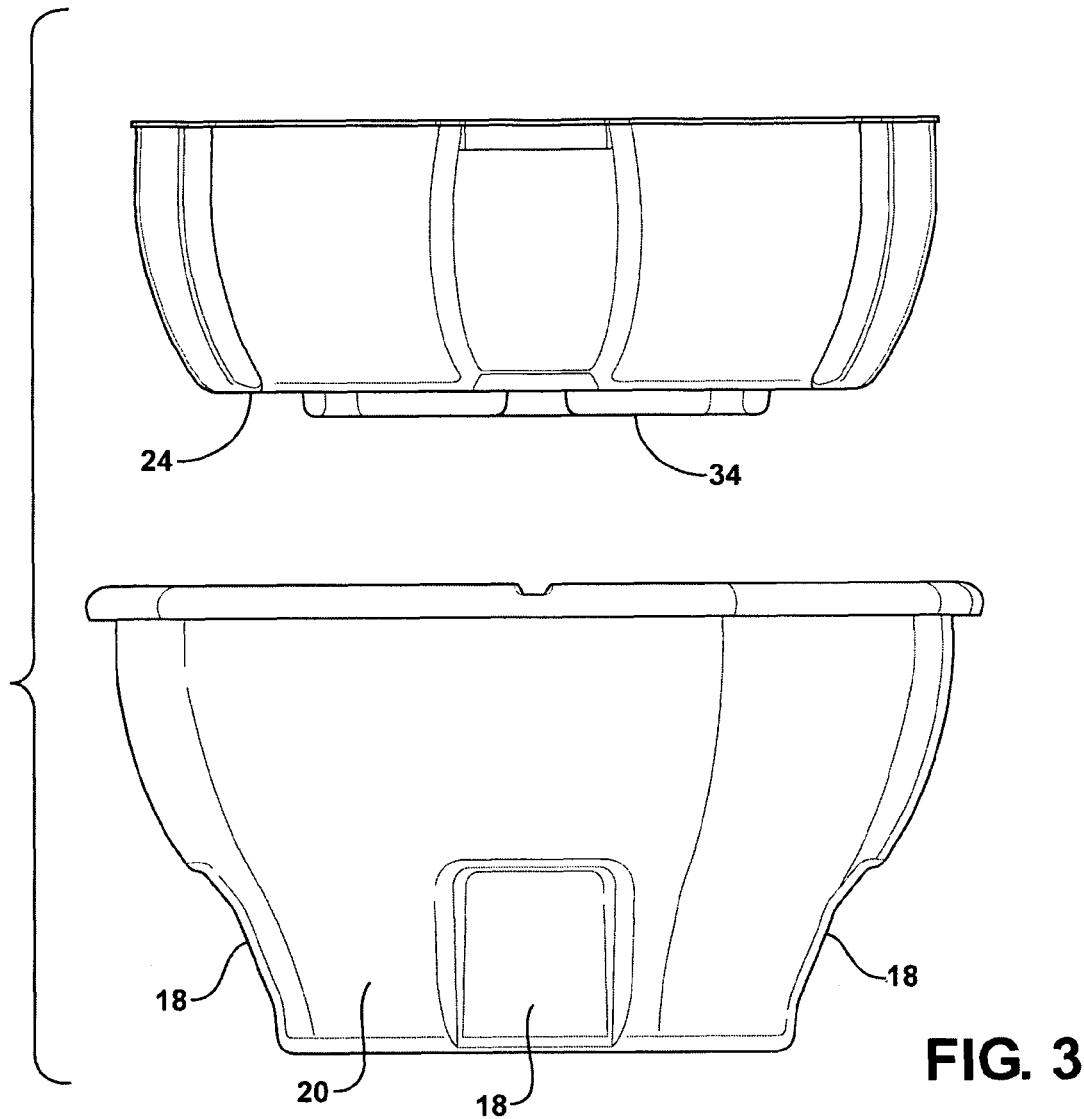
FIG. 3 is an exploded side elevational view of the two parts shown in FIG. 2.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, a two part container 10 according to the invention includes outer tub part 12 and a shorter height, bowl shaped plant holder inner part 14 nested within an upper region 16 of the outer part 12.

Both container parts 12, 14 are molded from a durable plastic material. The outer part has four indented step features 18 formed into the perimeter of a lower region 20, creating a series of radially inward extending aligned horizontal flat support surfaces 22 arrayed about the inner perimeter of the outer part 12.

The inner container part 14 has a generally flat bottom with an annular flat undersurface area 24 which is located to rest on the top of the surface 22 of the step features 18.

This stably supports the weight of the inner part and the soil and planting contained therein within the outer part 12.

The lower region 20 within the outer part 12 defines a reservoir space 26 for storing water.

One (or more) of the step flat surfaces 22 is formed with a depressed area 30 extending radially into the reservoir space 26 to be in fluid communication therewith, with a hole 32 penetrating through the thickness defining the surface 22 to allow outflow of water when reaching that level of the surface of the depressed area 30.

The inner holder part 14 bottom is formed with wedge shaped lower flat areas 34 intermediate a series of raised radial ribs 36 converging together around a central lower area 38.

Each of the lower flat areas 34 have a plurality of through openings extending therein which may be an array of holes 40 as shown or a pattern of slots described hereinafter.

The level of the lower flat areas 34 is set to be just above or even with the upper surface 30A of depressed area 30. This insures that the level of water in the reservoir space 26 does not reach the bottom of the soil space 42 in the inner container 14 but is very close, i.e., a distance approximately equal to the bottom wall thickness of the inner container, i.e., approximately ⅛ inch.

This small gap allows the roots to quickly grow into the water in the reservoir while insuring that the soil mass remains isolated from the water in the reservoir space 26 at its highest level.

Figure 4:
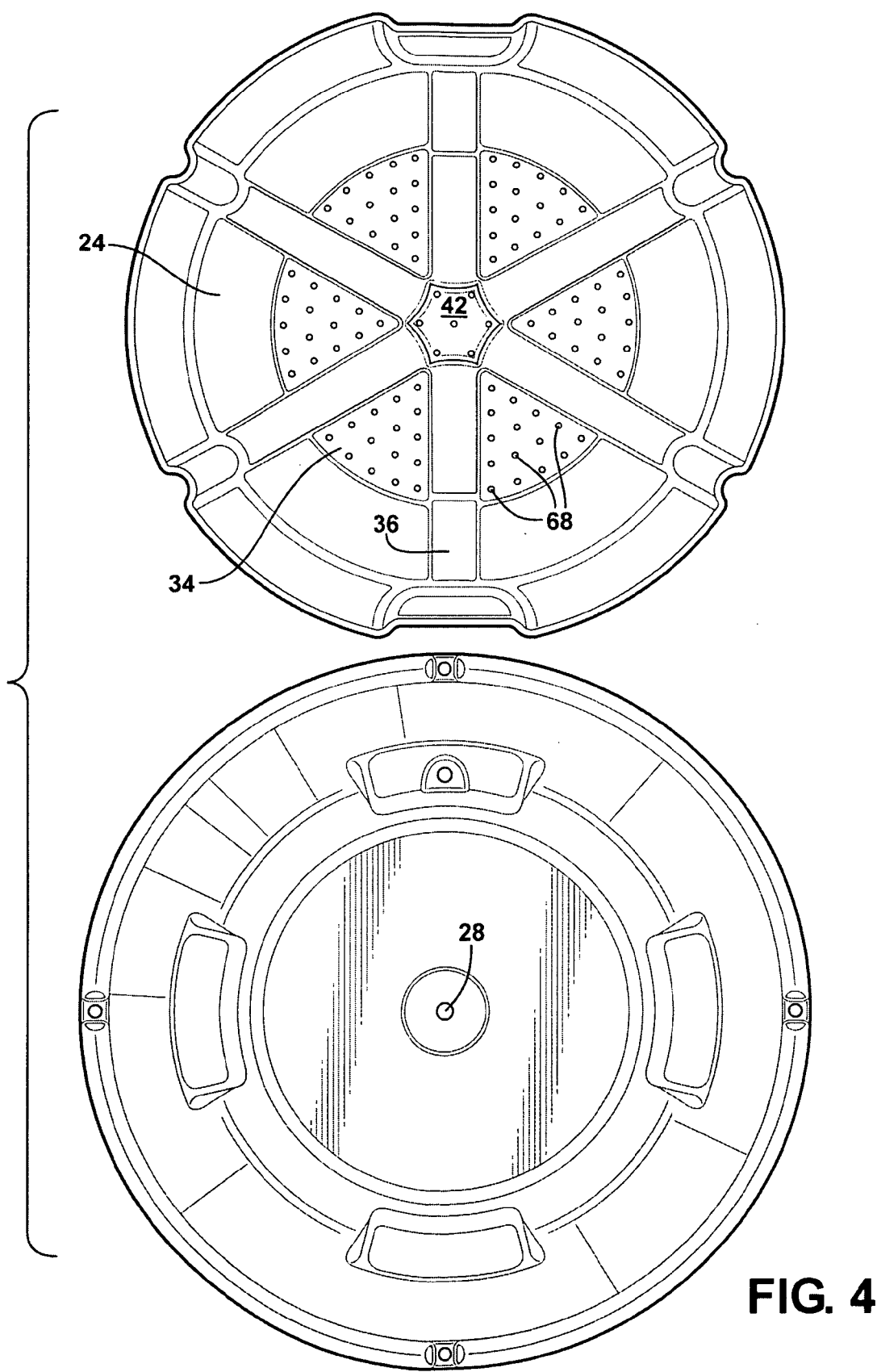
FIG. 4 is a side-by-side top view of the two parts shown in FIGS. 2 and 3.
Figure 5:
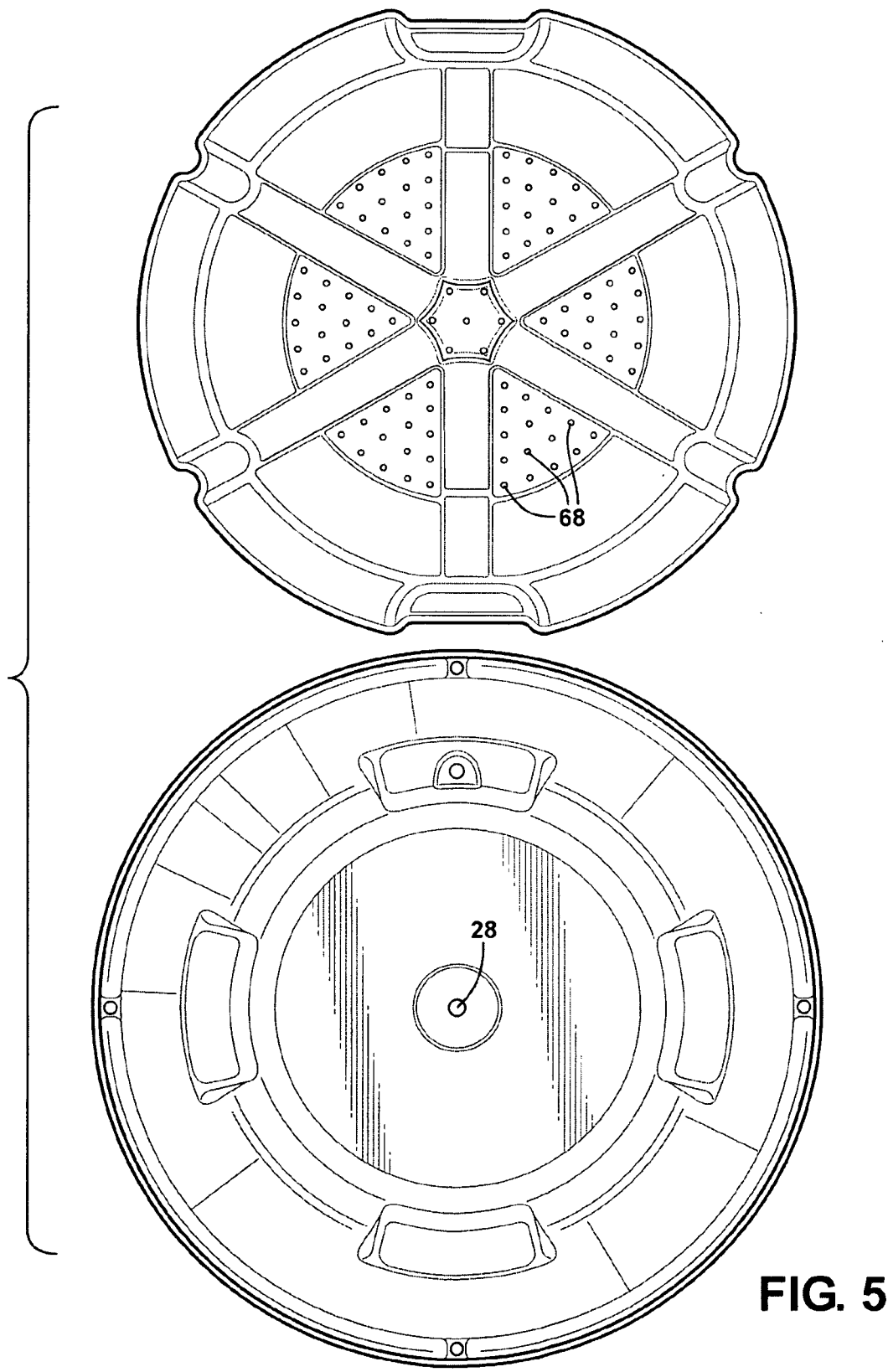
FIG. 5 is a side-by-side bottom view of the two parts shown in FIGS. 2 and 4.
Figure 6:
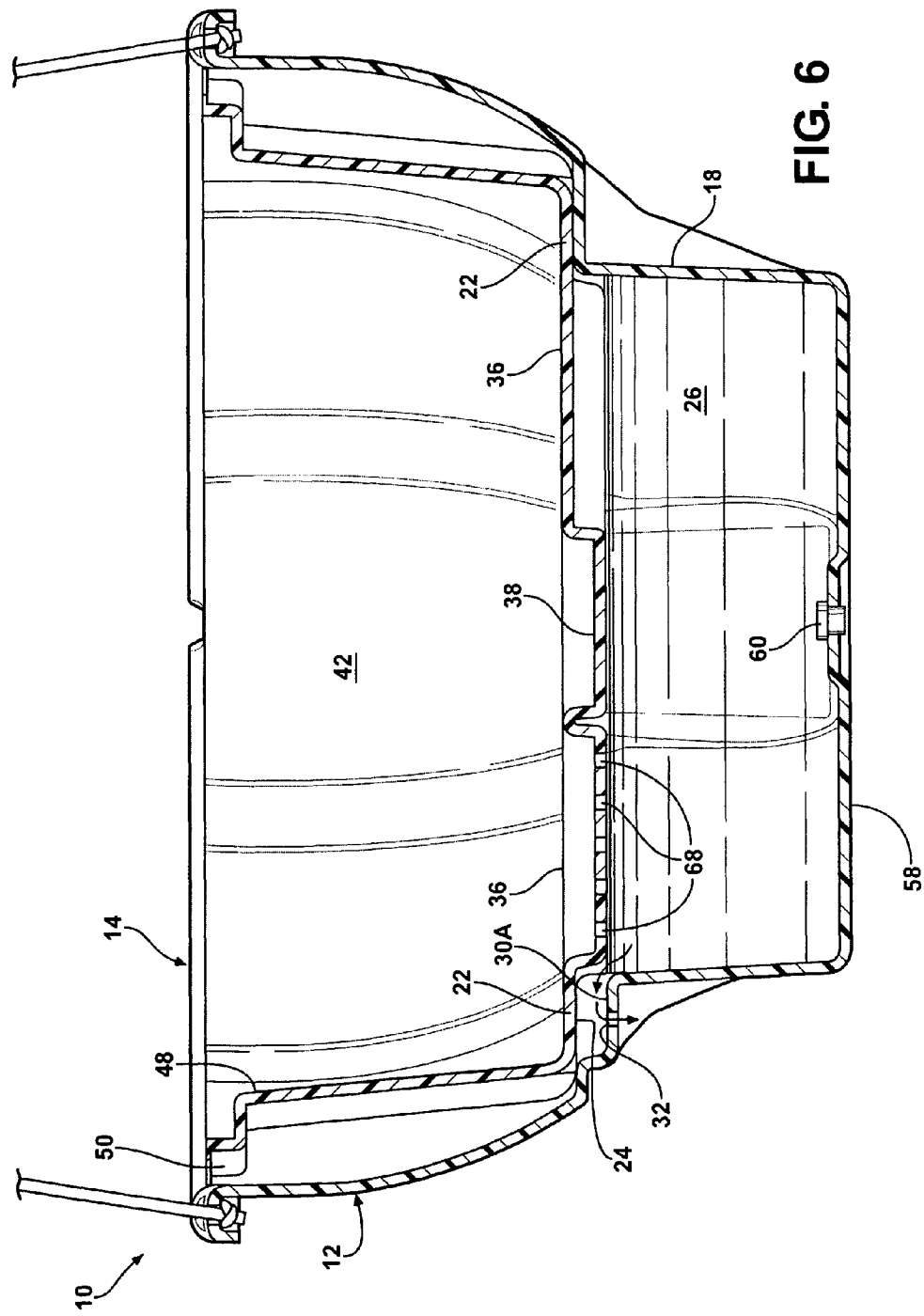
FIG. 6 is a transverse sectional view through the two part container shown in FIG. 1.

The bottom wall of the inner container 14 is stiffened by the series of radially convergent ribs 36 which join each other as seen in FIG. 4, the ends arranged around a generally hexagonal center area 42. Four of the ribs 36 have portions 44 which continue up the sidewall 46 to stiffen the sidewall 44 as well.

At two opposite locations the sidewall 46 is formed with generally rectangular radially inward indentations 48 creating an opening 50 between the inside of the outer container part 12 and the outer side of the indentations 48.

The openings 50 are sized to comfortably allow insertion of the four fingers of a person's hand, i.e., approximately a 5 inch wide opening. The top of the indentation 40 includes a shoulder 52 which forms an undersurface which extends radially inwardly and allows a person to hook the tips of his or her fingers behind the indentation after insertion of his fingers into opening 50 so that the inner container part 14 can conveniently be lifted out of the outer part 12.

The shoulders 18 also provide convenient exterior handholds for lifting the outer part 12.

The ribs 36 blend into the indentations 40 as shown to further strengthen the side wall 46.

A drain hole 54 is formed in the bottom of a central raised area 56 in the center of the outer part bottom wall 58 which is normally closed with a plug 60 but can be removed to conveniently enable draining water from the reservoir space 26 as when the entire container 10 is to be moved.

A series of perimeter holes 62 can be provided in the rim 64 of the outer tub part 12 for attachment of hanging elements, such as wires, etc.

Figure 7:
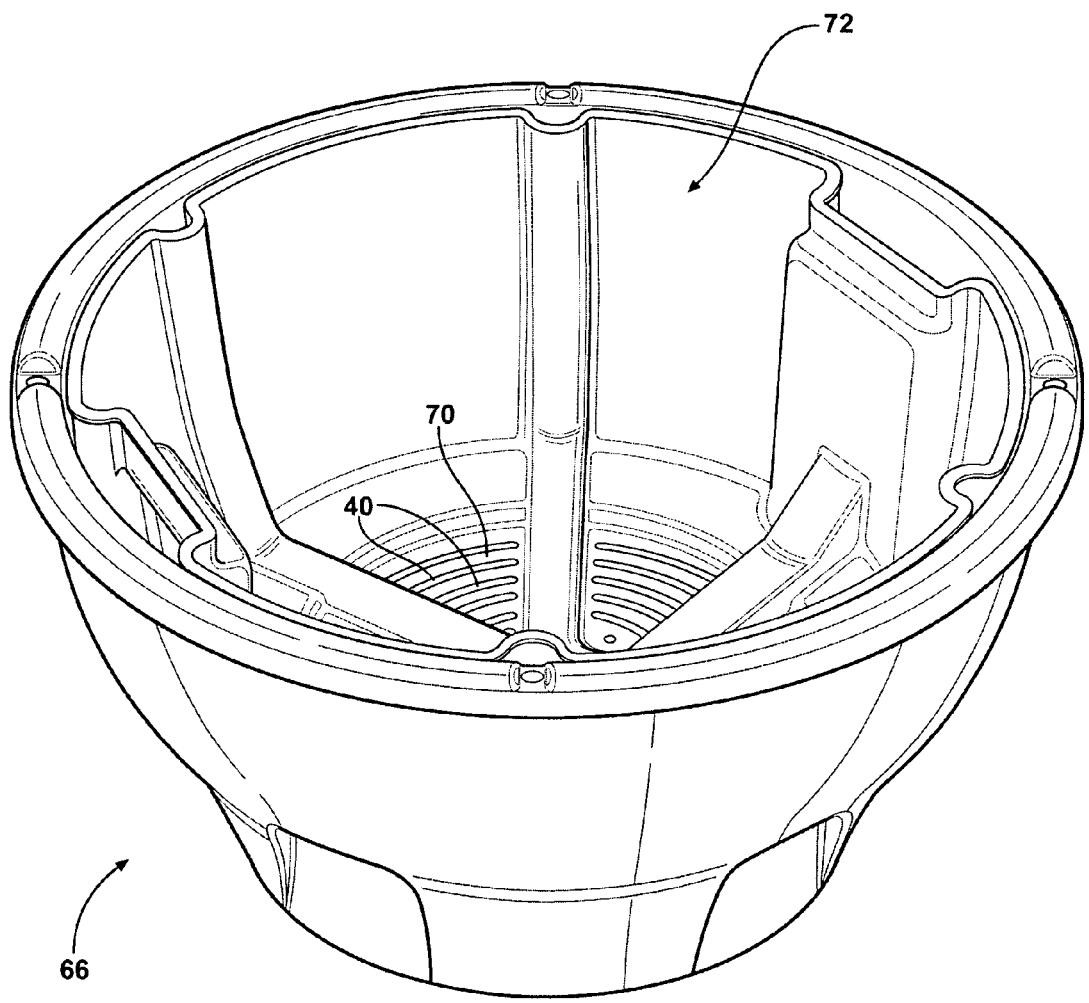
FIG. 7 is an exploded pictorial view of an alternate form of the two part container according to the invention.

FIG. 7 shows a two part container 66 according to the invention in which a series of slots 68 are formed in the bottom wall 70 of the inner part 72 of the container 66 instead of the holes 40 in the above described embodiment.

Figure 8:
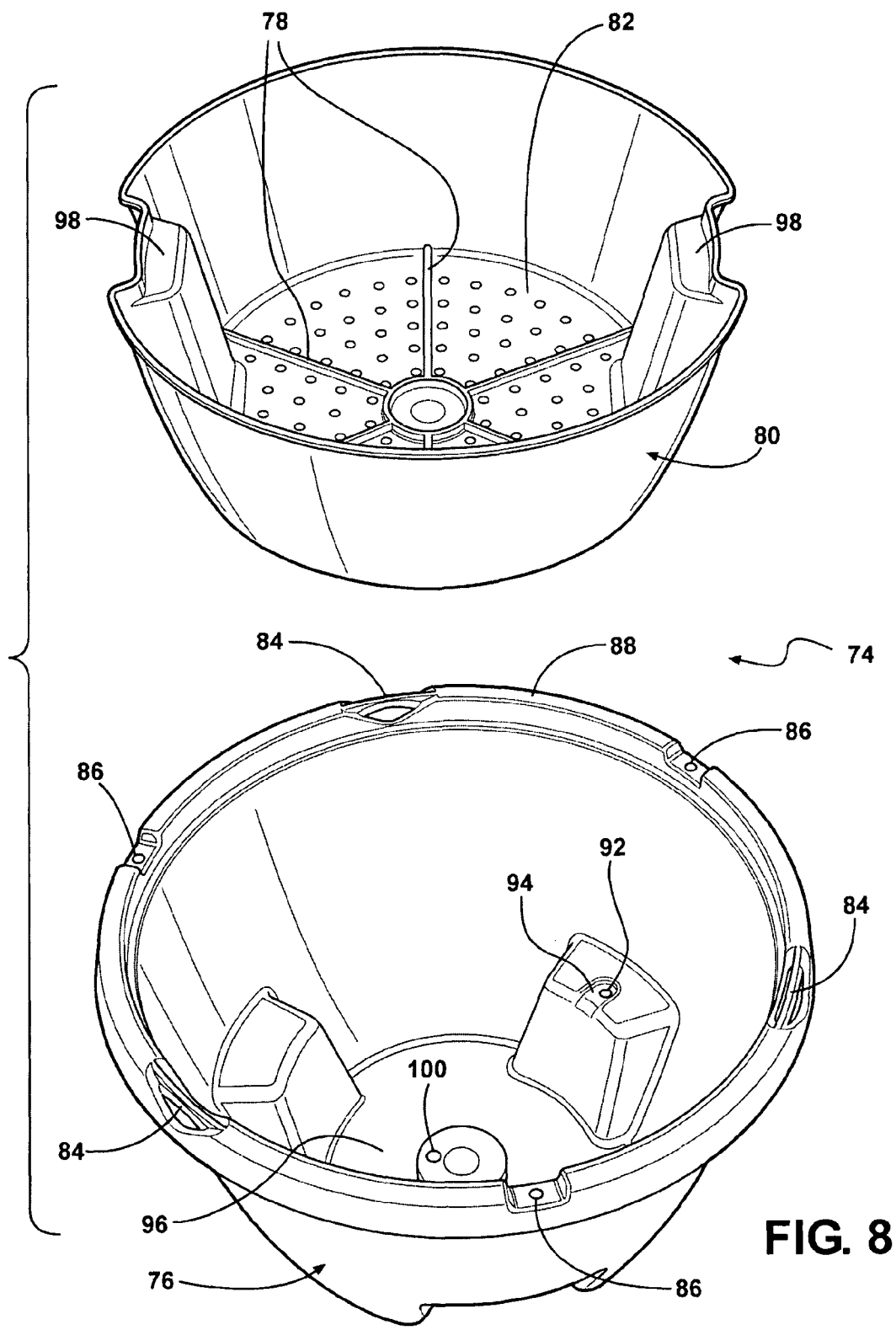
FIG. 8 is an exploded pictorial view of a smaller two part container according to the invention.

FIG. 8 shows another embodiment of a smaller container 74 also comprised of an outer tube part 76 and an inner holder part. The ribs here comprise radially convergent ridges 78 molded into the bottom wall 82 of the inner part 80.

The outer part 76 has alternate loop features 84 and holes 86 in the rim 88 for attachment of support wires, etc. (not shown). Step features 90 in the outer part 76 are provided for supporting the inner part 80 with a drain hole 92 in a depressed area 94 setting the maximum water level in a reservoir space 96 opposite hand grip features 98 are molded into the upper wall of the inner part 80.

A normally plugged drain hole 100 is formed in the bottom of the outer part 76.

In use, water is poured into the inner container 14 to saturate the soil mass, with excess water then passing into and collected in the reservoir space 26 until reaching the level of the hole 32 where outflow may be observed to provide an indication that the reservoir space 26 is full.

At this level there is only a short gap (⅛ inch) between the soil mass and the level of water in the reservoir to insure no wicking of water up into the soil mass, but allow roots to quickly grow into the water.

The inner part can be conveniently lifted out for changing plantings if desired; and the outer tub part 12 can be conveniently handled via the hand grip indentations 18.

The shape of both of the two parts is easily molded, offers sturdy support for the weight of the soil, planting and water, as well as to accurately locate the parts properly.

The invention claimed is:

1. A two part plant container comprising:
an outer tub-shaped part;
an inner bowl shaped holder part nested into an upper region of said outer tub part with a water reservoir space in said outer part defined spaced below a bottom wall of said inner part;
said inner part resting on a plurality of radially inwardly extending surfaces formed into a sidewall of said outer part so as to define a series of aligned horizontal surfaces on which said inner part is supported nested within said upper region of said outer part; said inner part bottom wall having regions formed with an array of openings therethrough allowing drainage of water into said reservoir space.

2. The two part plant container according to claim 1 wherein said inner container has a sidewall nested into said upper region of said upper part, with a pair of oppositely located inwardly formed handhold opening features defined between said inner perimeter of said outer part and an outer perimeter of said side wall configured to allow insertion of the fingers of a person's hand therein to allow lifting out of said inner part.

3. The two part plant container according to claim 2 wherein each of said handhold features additionally include an undersurface extending further in radially from said handhold opening feature to create a contour for hooking the fingers to provide an additional laid in lifting out said inner part of said container from said outer part.

4. The two part plant container according to claim 1 wherein at least one of said horizontal surfaces includes a depressed area extending inwardly to said reservoir space, with a through drain opening therein allowing outflow of water beneath an inner part undersurface resting thereon to set the maximum water level in said reservoir space.

5. The two part plant container according to claim 4 wherein said inner part bottom all includes a lowermost area region lying inward from and slightly below said undersurfaces to be substantially level with said depressed area whereby the maximum level of water in said reservoir space is beneath an upper surface of said lowermost region of said bottom wall of said inner part to prevent contact of soil therein with water in said reservoir space.

6. The two part plant container according to claim 5 wherein said regions formed with through openings are within said lowermost regions of said bottom wall.

7. The two part plant container according to claim 1 further including a series of ribs radially extending inwardly from said side wall and converging together at a center region thereof to reinforce said bottom wall.

8. The two part plant container according to claim 7 wherein wedge shaped lower regions are intermediate said ribs with said through openings are formed in said wedge shaped regions.

9. The two part plant container according to claim 7 wherein at least some of said ribs extend up said side wall of said inner part.

10. The two part plant container according to claim 1 wherein said outer part has an outturned rim around an upper perimeter edge and a series of hanger holes is formed about said rim.

* * * * *